(12) United States Patent
Vilkamo et al.

(10) Patent No.: US 11,350,213 B2
(45) Date of Patent: May 31, 2022

(54) SPATIAL AUDIO CAPTURE

(71) Applicant: Nokia Technologies Oy, Espoo (FI)

(72) Inventors: Juha Vilkamo, Helsinki (FI);
Mikko-Ville Laitinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/981,767

(22) PCT Filed: Mar. 22, 2019

(86) PCT No.: PCT/FI2019/050239
§ 371 (c)(1),
(2) Date: Sep. 17, 2020

(87) PCT Pub. No.: WO2019/185988
PCT Pub. Date: Oct. 3, 2019

(65) Prior Publication Data
US 2021/0099795 A1    Apr. 1, 2021

(30) Foreign Application Priority Data

Mar. 27, 2018 (GB) ...................... 1804938

(51) Int. Cl.
*H04R 3/00* (2006.01)
*G10L 19/008* (2013.01)
*H04S 7/00* (2006.01)

(52) U.S. Cl.
CPC ............ *H04R 3/005* (2013.01); *G10L 19/008* (2013.01); *H04S 7/30* (2013.01)

(58) Field of Classification Search
CPC .............. H04R 3/005; H04R 2201/401; H04R 2430/21
(Continued)

(56) References Cited

U.S. PATENT DOCUMENTS

| 5,778,082 A | 7/1998 | Chu et al. ........................ 381/92 |
| 2004/0190730 A1 | 9/2004 | Rui et al. ........................ 381/92 |

(Continued)

FOREIGN PATENT DOCUMENTS

| CN | 101911724 A | 12/2010 |
| CN | 101981944 A | 2/2011 |

(Continued)

OTHER PUBLICATIONS

Pulkki, Ville, et al., "Parametric Time-Frequency Domain Spatial Audio", © 2018, Wiley-IEEE Press, abstract, 1 pg.

(Continued)

*Primary Examiner* — Alexander Krzystan
(74) *Attorney, Agent, or Firm* — Harrington & Smith

(57) ABSTRACT

An apparatus for spatial audio signal processing, the apparatus including at least one processor and at least one memory including a computer program code, the at least one memory and the computer program code configured to, with the at least one processor, cause the apparatus at least to: receive audio signals from a microphone array, the microphone array including three or more microphones forming a geometry with defined displacements between pairs of the three or more microphones; determine delay information between audio signals associated with the pairs of the three or more microphones; determine an operator based on the geometry with defined displacements between the pairs of the three or more microphones; apply the operator to the delay information to generate at least one direction parameter associated with the audio signals.

20 Claims, 13 Drawing Sheets

(58) Field of Classification Search
USPC .................................................. 381/92, 1
See application file for complete search history.

(56) References Cited

U.S. PATENT DOCUMENTS

| | | | |
|---|---|---|---|
| 2007/0172079 A1* | 7/2007 | Christoph | H04R 1/406 381/92 |
| 2011/0019835 A1 | 1/2011 | Schmidt et al. | 381/71.11 |
| 2012/0140947 A1 | 6/2012 | Shin | 381/92 |
| 2014/0177867 A1* | 6/2014 | Christoph | H04R 3/005 381/92 |
| 2015/0156578 A1 | 6/2015 | Alexandridis et al. | |
| 2017/0127175 A1 | 5/2017 | Sanders | 1/326 |
| 2017/0188138 A1 | 6/2017 | Makinen et al. | 1/326 |
| 2017/0330580 A1* | 11/2017 | Wolff | H04R 3/005 |
| 2017/0366896 A1* | 12/2017 | Adsumilli | G11B 27/10 |
| 2018/0210065 A1* | 7/2018 | Shams | G01S 5/22 |
| 2021/0099795 A1* | 4/2021 | Vilkamo | G10L 19/008 |

FOREIGN PATENT DOCUMENTS

| | | |
|---|---|---|
| CN | 105210389 A | 12/2015 |
| CN | 107533843 A | 1/2018 |
| EP | 2 991 382 A1 | 3/2016 |
| WO | WO-2017/005978 A1 | 1/2017 |

OTHER PUBLICATIONS

Takguchi, Tetsuya, et al., "Active Microphone With Parabolic Reflection Board For Estimation of Sound Source Direction", IEEE 2008, pp. 65-68.

Ju, Tai-liang, et al., "Research on 2D DOA Estimations Focusing Methods Based on Microphone Arrays", Journal of University of Electronic Science and Technology of China, vol. 17, No. 2, Mar. 2008, pp. 225-228.

* cited by examiner

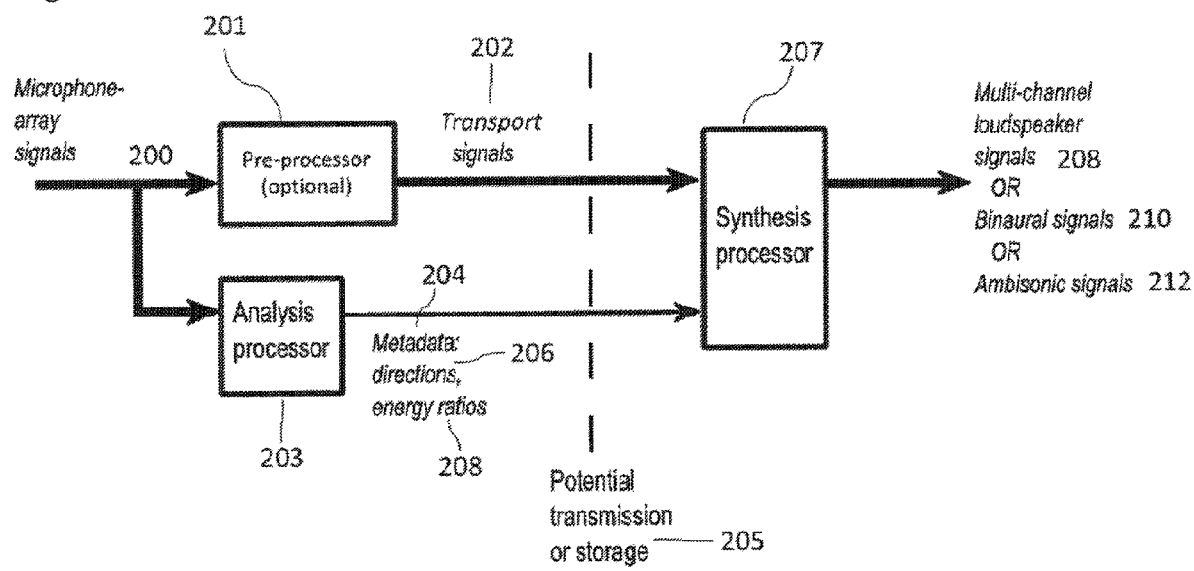

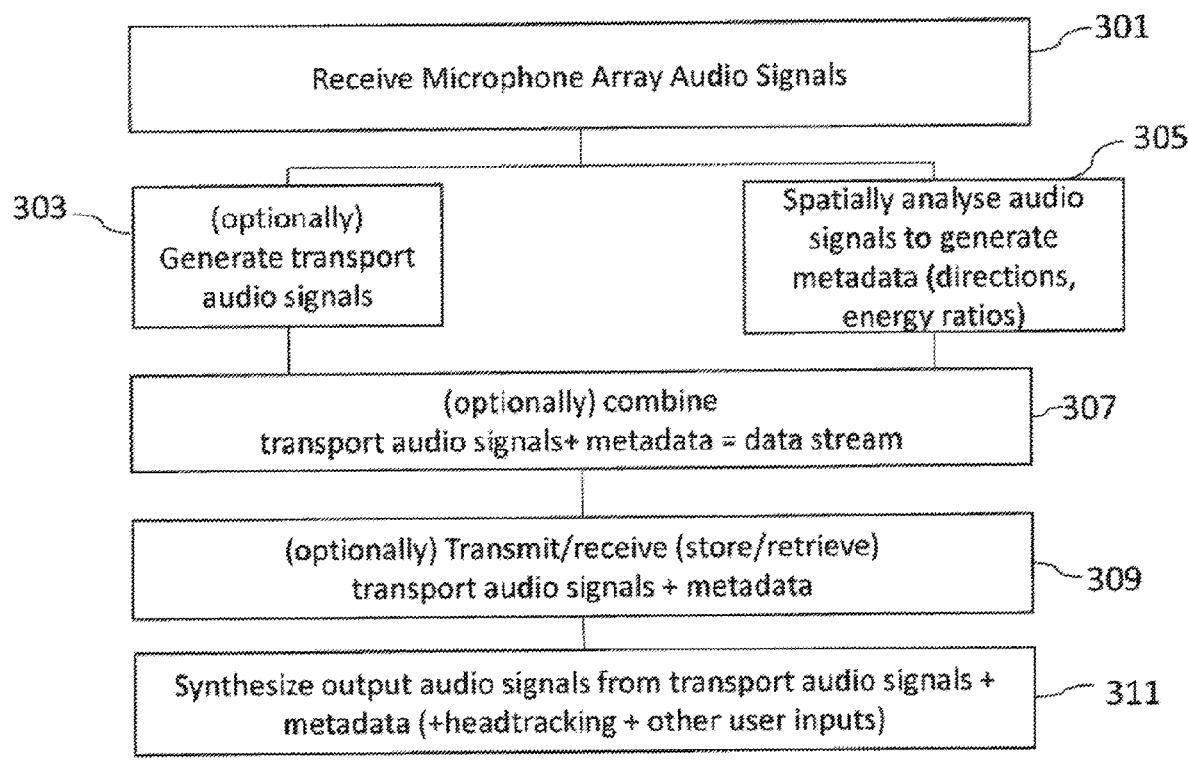

SPATIAL AUDIO CAPTURE

CROSS REFERENCE TO RELATED APPLICATION

This patent application is a U.S. National Stage application of International Patent Application Number PCT/FI2019/050239 filed Mar. 22, 2019, which is hereby incorporated by reference in its entirety, and claims priority to GB 1804938.7 filed Mar. 27, 2018.

FIELD

The present application relates to apparatus and methods for spatial audio capture. This includes but is not exclusively apparatus and methods for spatial audio capture from devices without substantial acoustic shadowing at one or more axes.

BACKGROUND

Parametric spatial audio capture and processing is a field of audio signal capture and processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratio parameters expressing relative energies of the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

Traditional linear spatial audio capture methods can be applied to high-end arrays (e.g. multi-microphone spheres, or a set of directional microphones). Parametric spatial audio capture methods can be applied to the high-end arrays, and also to more modest arrays, such as those on mobile phones, or small VR cameras, etc.

SUMMARY

There is provided according to a first aspect an apparatus comprising at least one processor and at least one memory including a computer program code, the at least one memory and the computer program code configured to, with the at least one processor, cause the apparatus at least to: receive audio signals from a microphone array, the microphone array comprising three or more microphones forming a geometry with defined displacements between pairs of the three or more microphones; determine delay information between audio signals associated with the pairs of the three or more microphones; determine an operator based on the geometry with defined displacements between the pairs of the three or more microphones; apply the operator to the delay information to generate at least one direction parameter associated with the audio signals.

The apparatus may be further caused to: identify a pair of microphones of the three or more microphones; determine a normalised coherence value of the audio signals associated with the identified pair of the three or more microphones; and output the normalised coherence value of the audio signals associated with the identified pair of microphones of the three or more microphones as an energy ratio parameter associated with the audio signals.

The apparatus caused to identify a pair of microphones of the three or more microphones may be caused to identify a pair of microphones with a largest displacement.

The apparatus caused to determine delay information between audio signals associated with the pairs of the three or more microphones may be caused to select the pairs of the three or more microphones from a complete set of all pairs of the three or more microphones, and wherein the apparatus caused to identify a pair of microphones with a largest displacement may be caused to identify a pair of microphones of a group of the three or more microphones with a largest displacement from only the selected pairs.

The apparatus may be further caused to: select from the audio signals a first part comprising audio signals above a defined frequency associated with the geometry with defined displacements between pairs of three or more microphones, wherein the apparatus caused to determine delay information between audio signals associated with the pairs of the three or more microphones may be caused to determine delay information between the first part comprising audio signals above the defined frequency associated with the geometry with defined displacements between pairs of three or more microphones.

The apparatus may be is further caused to select a second part comprising audio signals below the defined frequency associated with the geometry with defined displacements between the pairs of three or more microphones, wherein the apparatus may be further caused to analyse the second part comprising audio signals below the defined frequency to determine further spatial parameters.

The apparatus caused to determine an operator based on the geometry with defined displacements between the pairs of the three or more microphones may be caused to: formulate displacement vectors associated with a displacement between the pairs of three or more microphones; formulate a displacement matrix based on the formulated displacement vectors; and apply matrix arithmetics to the displacement matrix to generate the matrix operator.

The apparatus may be further caused to identify and remove from the formulation of the displacement matrix any displacement vector associated with a pair of microphones with unreliable delay information.

The apparatus may be further caused to determine a pair of microphones with unreliable delay information based on at least one of: a coherence value for audio signals associated with the pair of microphones is less than a defined threshold value; and an energy for audio signals associated with the pair of microphones is less than an energy for audio signals associated with at least one further pair of microphones by a defined threshold value or ratio.

The microphone array may comprise one of: three or more microphones and the at least one direction parameter associated with the audio signals is a single (azimuth or elevation) dimensional direction parameter; and four or more microphones and the at least one direction parameter associated with the audio signals is a two dimensional (azimuth and elevation) direction parameter.

The apparatus caused to apply the operator to the delay information to generate at least one direction parameter associated with the audio signals may be caused to: determine a direction vector by an application of the operator to the delay information; and generate the at least one direction parameter from a direction of the direction vector.

The apparatus may be further caused to: generate at least one transport signal based on the audio signals; transmit and/or store the at least one transport signal and the directional parameter.

The apparatus caused to transmit and/or store the at least one transport signal and the directional parameter may be further caused to transmit and/or store the at least one transport signal, the directional parameter and the energy ratio.

The apparatus caused to determine delay information between audio signals associated with the pairs of the three or more microphones may be caused to determine delay information between audio signals associated with at least two pairs of the three or more microphones.

The apparatus caused to determine delay information between audio signals associated with the pairs of the three or more microphones may be caused to determine delay information between audio signals on a frequency band by frequency band basis, and wherein the apparatus caused to generate at least one direction parameter associated with the audio signals may be caused to generate at least one direction parameter on a further frequency band by band basis.

The frequency band by frequency band basis may be the same as the further frequency band by band basis.

According to a second aspect there is provided a method for spatial audio signal processing, the method comprising: receiving audio signals from a microphone array, the microphone array comprising three or more microphones forming a geometry with defined displacements between pairs of the three or more microphones; determining delay information between audio signals associated with the pairs of the three or more microphones; determining an operator based on the geometry with defined displacements between the pairs of the three or more microphones; and applying the operator to the delay information to generate at least one direction parameter associated with the audio signals.

The method may further comprise: identifying a pair of microphones of the three or more microphones; determining a normalised coherence value of the audio signals associated with the identified pair of the three or more microphones; and outputting the normalised coherence value of the audio signals associated with the identified pair of microphones of the three or more microphones as an energy ratio parameter associated with the audio signals.

Identifying a pair of microphones of the three or more microphones may comprise identifying a pair of microphones with a largest displacement.

Determining delay information between audio signals associated with the pairs of the three or more microphones may comprise selecting the pairs of the three or more microphones from a complete set of all pairs of the three or more microphones, and identifying a pair of microphones of the three or more microphones with a largest displacement may comprise identifying a pair of microphones of a group of the three or more microphones with a largest displacement from only the selected pairs.

The method may further comprise: selecting from the audio signals a first part comprising audio signals above a defined frequency associated with the geometry with defined displacements between pairs of three or more microphones, wherein determining delay information between audio signals associated with the pairs of the three or more microphones may comprise determining delay information between the first part comprising audio signals above the defined frequency associated with the geometry with defined displacements between pairs of three or more microphones.

The method may further comprise selecting a second part comprising audio signals below the defined frequency associated with the geometry with defined displacements between the pairs of three or more microphones, wherein the method may further comprise analysing the second part comprising audio signals below the defined frequency to determine further spatial parameters.

Determining an operator based on the geometry with defined displacements between the pairs of the three or more microphones may comprise: formulating displacement vectors associated with a displacement between the pairs of three or more microphones; formulating a displacement matrix based on the formulated displacement vectors; and applying matrix arithmetics to the displacement matrix to generate the matrix operator.

The method may further comprise identifying and removing from the formulation of the displacement matrix any displacement vector associated with a pair of microphones with unreliable delay information.

The method may further comprise determining a pair of microphones with unreliable delay information based on at least one of: a coherence value for audio signals associated with the pair of microphones is less than a defined threshold value; and an energy for audio signals associated with the pair of microphones is less than an energy for audio signals associated with at least one further pair of microphones by a defined threshold value or ratio.

The microphone array may comprise one of: three or more microphones and the at least one direction parameter associated with the audio signals is a single (azimuth or elevation) dimensional direction parameter; and four or more microphones and the at least one direction parameter associated with the audio signals is a two dimensional (azimuth and elevation) direction parameter.

Applying the operator to the delay information to generate at least one direction parameter associated with the audio signals may comprise: determining a direction vector by an application of the operator to the delay information; and generating the at least one direction parameter from a direction of the direction vector.

The method may further comprise: generating at least one transport signal based on the audio signals; and transmitting and/or storing the at least one transport signal and the directional parameter.

Transmitting and/or storing the at least one transport signal and the directional parameter may comprise transmitting and/or storing the at least one transport signal, the directional parameter and the energy ratio.

Determining delay information between audio signals associated with the pairs of the three or more microphones may comprise determining delay information between audio signals associated with at least two pairs of the three or more microphones.

Determining delay information between audio signals associated with the pairs of the three or more microphones may comprise determining delay information between audio signals on a frequency band by frequency band basis.

Generating at least one direction parameter associated with the audio signals may comprise generating at least one direction parameter on a further frequency band by band basis.

The frequency band by frequency band basis may be the same as the further frequency band by band basis.

According to a third aspect there is provided an apparatus comprising means for: receiving audio signals from a microphone array, the microphone array comprising three or more microphones forming a geometry with defined displacements between pairs of the three or more microphones; determining delay information between audio signals associated with the pairs of the three or more microphones; determining an operator based on the geometry with defined displacements between the pairs of the three or more microphones; applying the operator to the delay information to generate at least one direction parameter associated with the audio signals.

The means for may further be configured for: identifying a pair of microphones of the three or more microphones; determining a normalised coherence value of the audio signals associated with the identified pair of the three or more microphones; and outputting the normalised coherence value of the audio signals associated with the identified pair of microphones of the three or more microphones as an energy ratio parameter associated with the audio signals.

The means for identifying a pair of microphones of the three or more microphones may be configured for identifying a pair of microphones with a largest displacement.

The means for determining delay information between audio signals associated with the pairs of the three or more microphones may be configured for selecting the pairs of the three or more microphones from a complete set of all pairs of the three or more microphones, and the means for identifying a pair of microphones of the three or more microphones with a largest displacement may be configured for identifying a pair of microphones of a group of the three or more microphones with a largest displacement from only the selected pairs.

The means for may further be configured for: selecting from the audio signals a first part comprising audio signals above a defined frequency associated with the geometry with defined displacements between pairs of three or more microphones, wherein the means for determining delay information between audio signals associated with the pairs of the three or more microphones may be configured for determining delay information between the first part comprising audio signals above the defined frequency associated with the geometry with defined displacements between pairs of three or more microphones.

The means for may further be configured for selecting a second part comprising audio signals below the defined frequency associated with the geometry with defined displacements between the pairs of three or more microphones, wherein the means for may further be configured for analysing the second part comprising audio signals below the defined frequency to determine further spatial parameters.

The means for determining an operator based on the geometry with defined displacements between the pairs of the three or more microphones may be configured for: formulating displacement vectors associated with a displacement between the pairs of three or more microphones; formulating a displacement matrix based on the formulated displacement vectors; and applying matrix arithmetics to the displacement matrix to generate the matrix operator.

The means may further be configured for identifying and removing from the formulation of the displacement matrix any displacement vector associated with a pair of microphones with unreliable delay information.

The means for may further be configured for determining a pair of microphones with unreliable delay information based on at least one of: a coherence value for audio signals associated with the pair of microphones is less than a defined threshold value; and an energy for audio signals associated with the pair of microphones is less than an energy for audio signals associated with at least one further pair of microphones by a defined threshold value or ratio.

The microphone array may comprise one of: three or more microphones and the at least one direction parameter associated with the audio signals is a single (azimuth or elevation) dimensional direction parameter; and four or more microphones and the at least one direction parameter associated with the audio signals is a two dimensional (azimuth and elevation) direction parameter.

The means for applying the operator to the delay information to generate at least one direction parameter associated with the audio signals may be configured for: determining a direction vector by an application of the operator to the delay information; and generating the at least one direction parameter from a direction of the direction vector.

The means may further be configured for: generating at least one transport signal based on the audio signals; and transmitting and/or storing the at least one transport signal and the directional parameter.

The means for transmitting and/or storing the at least one transport signal and the directional parameter may be configured for transmitting and/or storing the at least one transport signal, the directional parameter and the energy ratio.

The means for determining delay information between audio signals associated with the pairs of the three or more microphones may be configured for determining delay information between audio signals associated with at least two pairs of the three or more microphones.

The means for determining delay information between audio signals associated with the pairs of the three or more microphones may be configured for determining delay information between audio signals on a frequency band by frequency band basis.

The means for generating at least one direction parameter associated with the audio signals may be configured for generating at least one direction parameter on a further frequency band by band basis.

The frequency band by frequency band basis may be the same as the further frequency band by band basis.

According to a fourth aspect there is provided an apparatus comprising: receiving circuitry configured to receive audio signals from a microphone array, the microphone array comprising three or more microphones forming a geometry with defined displacements between pairs of the three or more microphones; delay determining circuitry configured to determine delay information between audio signals associated with the pairs of the three or more microphones; operator determining circuitry configured to determine an operator based on the geometry with defined displacements between the pairs of the three or more microphones; and direction parameter determining circuitry configured to apply the operator to the delay information to generate at least one direction parameter associated with the audio signals.

According to a fifth aspect there is provided a computer program comprising instructions [or a computer readable medium comprising program instructions] for causing an apparatus to perform at least the following: receiving audio signals from a microphone array, the microphone array comprising three or more microphones forming a geometry with defined displacements between pairs of the three or more microphones; determining delay information between audio signals associated with the pairs of the three or more microphones; determining an operator based on the geometry with defined displacements between the pairs of the three or more microphones; applying the operator to the delay information to generate at least one direction parameter associated with the audio signals.

According to a sixth aspect there is provided a non-transitory computer readable medium comprising program instructions for causing an apparatus to perform at least the following: receiving audio signals from a microphone array, the microphone array comprising three or more microphones forming a geometry with defined displacements between pairs of the three or more microphones; determining delay information between audio signals associated with the pairs of the three or more microphones; determining an operator based on the geometry with defined displacements between the pairs of the three or more microphones; applying the operator to the delay information to generate at least one direction parameter associated with the audio signals.

According to a seventh aspect there is provided a computer readable medium comprising program instructions for causing an apparatus to perform at least the following: receiving audio signals from a microphone array, the microphone array comprising three or more microphones forming a geometry with defined displacements between pairs of the three or more microphones; determining delay information between audio signals associated with the pairs of the three or more microphones; determining an operator based on the geometry with defined displacements between the pairs of the three or more microphones; applying the operator to the delay information to generate at least one direction parameter associated with the audio signals.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which:

FIG. 2 shows schematically a system utilizing embodiments described herein;

FIG. 3 shows a flow diagram of the operation of the example system shown in FIG. 2;

EMBODIMENTS OF THE APPLICATION

The following describes in further detail suitable apparatus and possible mechanisms for the provision of acoustic capture.

As described above parametric spatial audio capture and processing methods can be used to enable a perceptually accurate spatial sound reproduction based on practical microphone arrangements. Parametric spatial audio capture refers to adaptive DSP-driven audio capture methods covering 1) analysing perceptually relevant parameters in frequency bands, for example, the directionality of the propagating sound at the recording position, and 2) reproducing spatial sound in a perceptual sense at the rendering side according to the estimated spatial parameters. The reproduction can be, for example, for headphones or multichannel loudspeaker setups. By estimating and reproducing the perceptually relevant spatial properties (parameters) of the sound field, a spatial perception similar to that which would occur in the original sound field can be reproduced. As the result, the listener can perceive the multitude of sources, their directions and distances, as well as properties of the surrounding physical space, among the other spatial sound features, as if the listener was in the position of the capture device.

Figure 1A:
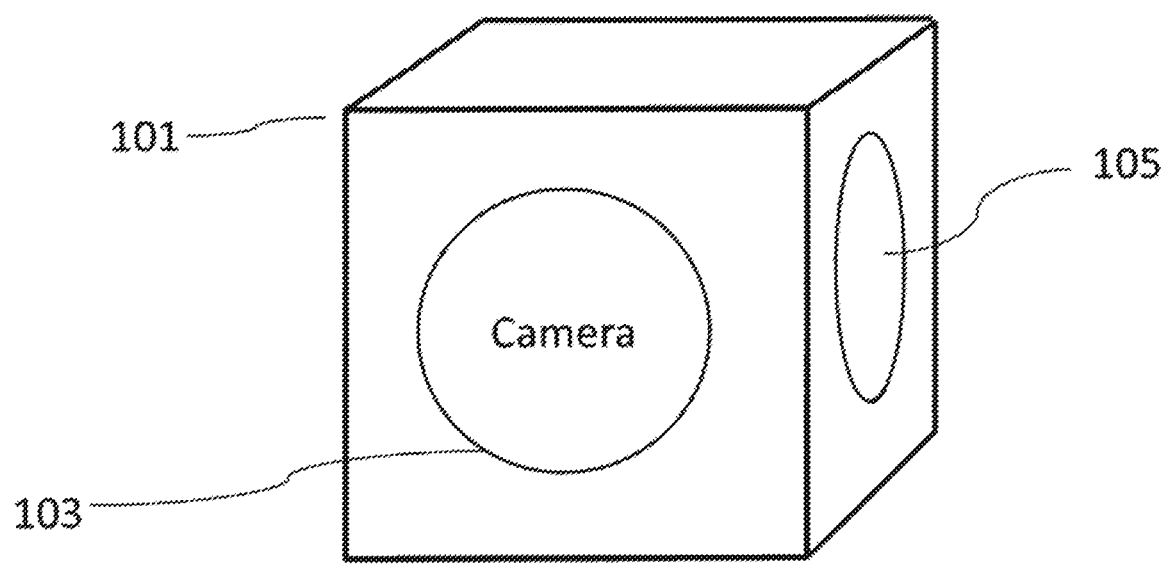
FIG. 1a shows schematically an example device geometry.

An example video capture device is shown in FIG. 1a. The device is shown with two cameras 103 and 105 located on the sides of the cube like apparatus shape. There may furthermore be additional cameras unseen on FIG. 1a located on the other sides to enable the device 101 to capture 360-degree video. In some embodiments the device may be configured to also capture surround or 3D audio, so that the user of the virtual reality (VR) media content may utilize the auditory cues to orient the view towards the direction of interest, even if that direction is not in the field of view. Furthermore a user may require a surround or 3D audio reproduced output to produce an overall realistic spatial auditory perception which together with the visual VR reproduction produces an overall immersive experience.

The device 101 may be other than a VR camera. For example, the device may be a teleconferencing device, mobile phone, tablet computer. The device in some embodiments may comprise a single camera (or even no cameras at all). In some embodiments the device may comprise an integrated loudspeaker and the device could be of a similar shape as the device in FIG. 1a.

In order to capture the spatial audio, microphones are located or mounted on the device. For a device such as shown in FIG. 1a a minimum number of microphones to generate a suitable 3D (azimuth+elevation) audio capture is four. This is because at least some spacing between the microphones of the microphone array is required on all axes. A 2D (azimuth or elevation) audio capture device may employ a three microphone device.

The placement of the microphones may be defined in an attempt to generate the best foundation for the spatial audio capture. To aim for the best performance at low frequencies (because of audio wavelengths with respect to the device size) the microphones should be placed as far apart as possible from each other.

Figure 1B:
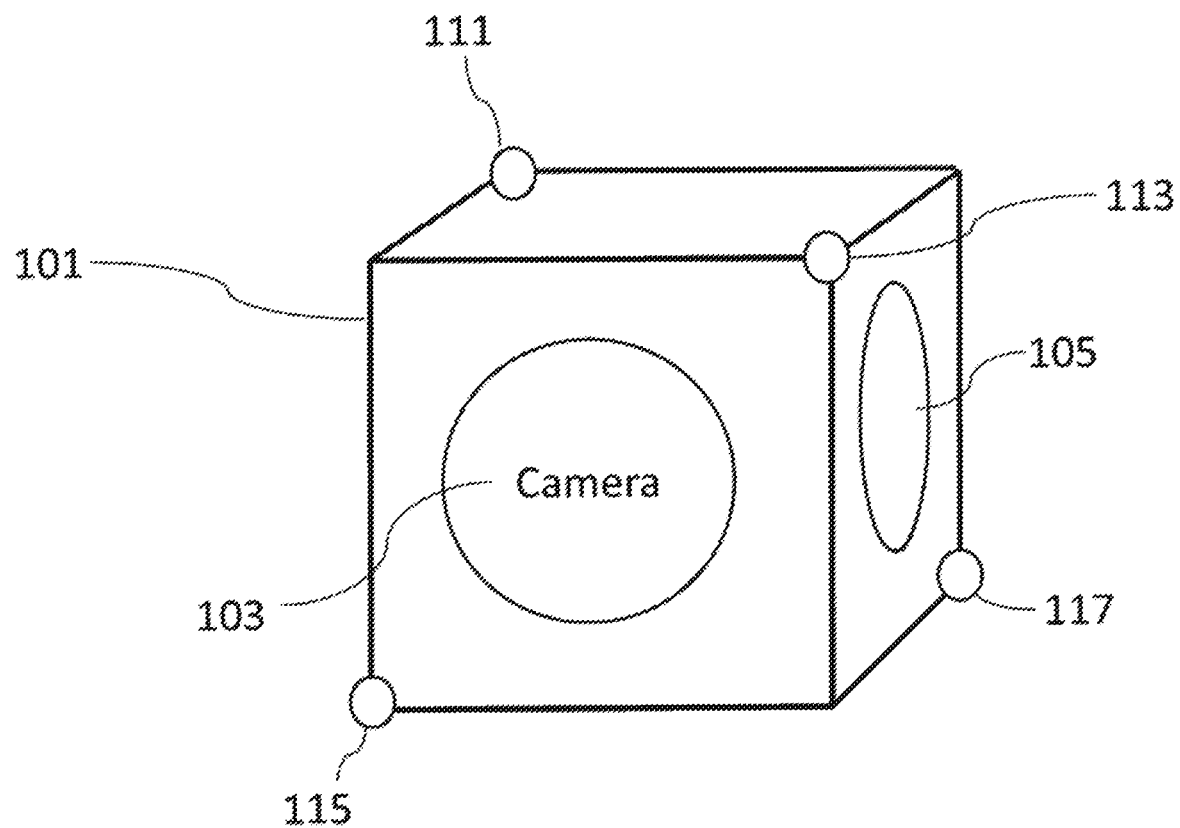
FIG. 1b shows schematically an example device camera and microphone geometry.

With respect to FIG. 1b the example device 101 is shown with an example placement of four microphones 111, 113, 115, 117 in a tetrahedral arrangement. For example a first microphone 111 located at a corner of the top, rear and left faces of the device 101, a second microphone 113 located at a corner of the top, front and right faces of the device 101, a third microphone 115 located at a corner of the bottom, front and left faces of the device 101 and a fourth microphone 117 located at a corner of the bottom, rear and right faces of the device 101. This arrangement maximizes the size of the microphone array for the device size and therefore performance at low frequencies.

In some embodiments the microphones may not be located at the corners as shown in FIG. 1b but may be located towards the centre of the device sides on any axis if other aspects of the hardware design have an impact. However, in such examples the array separation is smaller.

In some embodiments the output signal of a capture device is in an Ambisonics format (e.g. first-order Ambisonics (FOA)). Some VR formats use FOA as the audio format to convey spatial audio. In such embodiments FOA signals may be synthesized such that below the spatial aliasing or defined frequency they are formulated linearly, and
above spatial aliasing parametrically.

In other words in some embodiments a linear reproduction of FOA signals needs also be considered in terms of the microphone placement to avoid biasing of the FOA pattern shapes at some frequencies.

Therefore the device with an example diameter of 10-30 cm may be designed to have 1) as equally distributed microphone spacing as possible and
2) as large array as possible, for a given design constraint set.

Figure 1C:
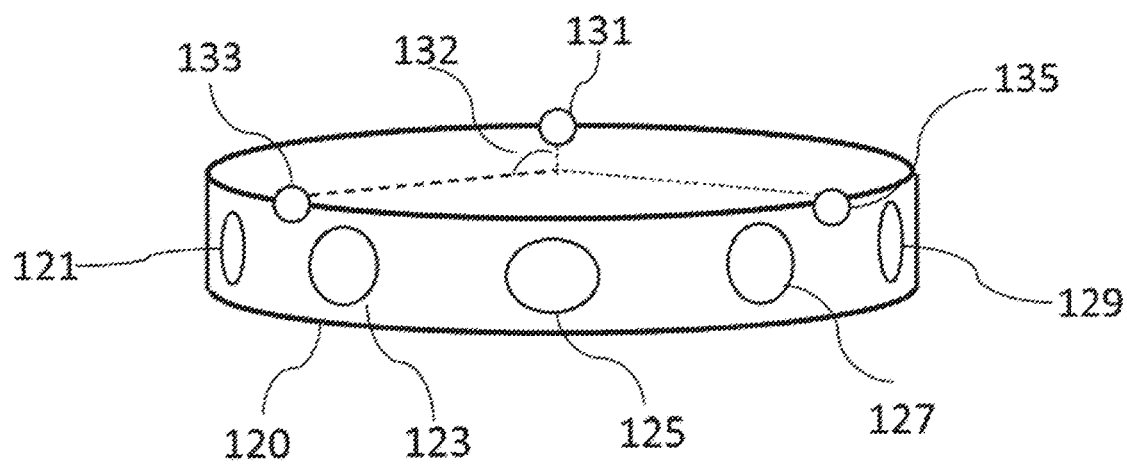
FIG. 1c shows schematically a further example device camera and microphone geometry.

An example 360-degree horizontal surround capture device 120 and placement of microphones on it is shown in FIG. 1c. The device is cylindrical in shape with cameras 121, 123, 125, 127, 129 located on the side and three microphones 131, 133, 135 are placed, in a balanced distribution and as far as possible from each other with angle 132, on the top base of the device. In some embodiments the microphones 131, 133, 135 may be moved towards the centre, which may cause some reduced performance in the low-frequencies, depending on how small the microphone array becomes because of other design requirements. It is understood that the example layout formed by the three microphones provides a two dimensional geometry in FIG. 1c and any suitable geometry may be formed in other alternative embodiments where the two dimensional geometry can have a non-uniform shape and the two dimensional geometry does not have to be perfectly aligned with the horizontal plane.

The following examples are described with respect to the devices shown in FIG. 1b. However, the methods described herein can be applied also to the horizontal surround capture for devices such as that in FIG. 1c and other shaped 3D and horizontal surround capture arrangements.

The concept is one of optimising capture with the microphone array such as shown in FIG. 1b and enabling determination of the direction-of-arrival at the frequencies below the spatial aliasing frequency, which could for a typical device size be approximately 2 kHz, and also above the spatial aliasing frequency. At these frequencies, the audio wavelength is too short to generate FOA signals or to utilize other analysis techniques that are based on an assumption that the inter-microphone phase may unambiguously contain information about the direction of the arriving sound.

Furthermore the embodiments may be employed to determine spatial parameters even for product design shapes when the shape does not generate substantial acoustic shadowing at some coordinate axes in respect of microphone layout, such as the horizontal plane as shown in the device in FIG. 1b. Acoustic shadowing enables the employment of an energy-based method to estimate a direction of arrival based on the microphone signal energies (or magnitudes).

A block diagram of an example system for implementing some embodiments is shown in FIG. 2. FIG. 2 shows an example system within which the embodiments may be implemented. The microphone audio signals 200 captured by the microphones 111, 113, 115, 117 may be stored and later processed, or directly processed.

An analysis processor 203 may receive the microphone audio signals 200 from the capture device 101. The analysis processor 203 can, for example, be a computer, VR camera or a mobile phone (running suitable software), or alternatively a specific device utilizing, for example, field programmable gate arrays (FPGAs) or application specific integrated circuits (ASICs). In some embodiments the capture device 101 and the analysis processor 203 are implemented on the same apparatus or device.

Based on the microphone-array signals, the analysis processor creates a data stream comprising spatial metadata 204 (e.g., directions 206 and energy ratios 208 in frequency bands). For example spatial metadata parameters determined include (but are not limited to): Direction and direct-to-total energy ratio; Direction and diffuseness; Inter-channel level difference, inter-channel phase difference, and inter-channel coherence. In some embodiments these parameters are determined in time-frequency domain. It should be noted that also other parametrizations may be used than those presented above. In general, typically the spatial audio parametrizations describe how the sound is distributed in space, either generally (e.g., using directions) or relatively (e.g., as level differences between certain channels). In the example shown in FIG. 2 the metadata 204 comprises directions 206 and energy ratios 208.

Furthermore the microphone array signals 200 may be passed to a pre-processor 201 (which may be optional). The pre-processor 201 may be configured to generate suitable transport audio signals 202. The pre-processor 201 may be configured to generate the transport audio signals by selecting an audio signal from the microphone array signals. In some embodiments the microphone array audio signals may be combined, for example by beamforming methods, to generate the transport audio signals. In some embodiments the transport audio signals may be obtained by otherwise processing the microphone array signals.

The pre-processor 201 may be configured to generate any suitable number of transport audio signals (or channels), for example in some embodiments the pre-processor 201 is configured to generate two transport audio signals. In some embodiments the pre-processor is further configured to encode the audio signals. For example in some embodiments the audio signals may be encoded using an advanced audio coding (AAC) or enhanced voice services (EVS) coding. In some embodiments the pre-processor 201 is configured to equalize the audio signals, apply automatic noise control, dynamic processing, or any other suitable processing.

The spatial metadata 204 and the transport audio signals 202 may be transmitted or stored for example within some storage 205 such as memory, or alternatively directly processed in the same device. In some embodiments the spatial metadata 204 and the transport audio signals 202 may be encoded or quantized or combined or multiplexed into a single data stream by a suitable encoding and/or multiplexing operation. In some embodiments the coded audio signal is bundled with a video stream (e.g., 360-degree video) in a media container such as an mp4 container, to be transmitted to a receiver.

A synthesis processor 207 may receive the spatial metadata 204 and the transport audio signals 202 (or in some embodiments the combined data stream). In some embodiments where a single data stream is received there may be a decoder and/or demultiplexer for decoding the received signal and/or demultiplexing the combined data stream into separate spatial metadata 204 and transport audio signals 202. Furthermore where either of the spatial metadata 204 and/or the transport audio signals 202 are encoded or quantized then the synthesis processor 207 or pre-processor may further decode or dequantize the signals.

The synthesis processor 207 can, for example, be a computer, a VR playback device or VR camera with playback capability, or a mobile phone (running suitable software), or alternatively a specific device utilizing, for example, FPGAs or ASICs. Based on the data stream (the transport audio signals and the metadata), the synthesis processor 207 can be configured to produce output audio signals. For headphone listening, the output signals can be binaural signals 210. For loudspeaker rendering, the output signals can be multi-channel loudspeaker signals 208. The output can also be Ambisonic signals 212. Ambisonic signals are a spatial audio signal representation that are employed to be decoded (to e.g. binaural) for listening. This typically means processing (using filters and/or mixing) to obtain the loudspeaker or binaural output from the Ambisonic signals.

A typical use case for the example capture devices using the embodiments described herein and where the output is Ambisonics is the following:
  The capture device captures the microphone signals, and determines the spatial metadata using these embodiments as described herein.
  At frequencies below the spatial aliasing frequency, the capture device could generate (from all original non-encoded microphone signals) the linear Ambisonic output.
  At higher frequencies (above the spatial aliasing frequency) the capture device could use the metadata produced by the embodiments described herein to synthesize the Ambisonic output parametrically (i.e. non-linearly, adaptively)
Then, the output Ambisonic signals are used as a spatial audio signal, to be combined with a suitable video data stream (for example a 360 video) and uploaded/streamed to a suitable VR service. The Ambisonic signals could in some embodiments be encoded with AAC at a sufficient bit rate, or similar codecs may be used.

The analysis and synthesis processors may be also within the same device, and may be also a part of the same software.

A suitable output form may be passed to headphones or other playback apparatus may be configured to receive the output of the synthesis processor 207 and output the audio signals in a format suitable for listening.

With respect to FIG. 3 is shown an example summary of the operations of the apparatus shown in FIG. 2.

The initial operation is receiving (from the capture device directly or otherwise) of the microphone array audio signals as shown in FIG. 3 by step 301.

The received microphone array audio signals may optionally be processed to generate transport audio signals as shown in FIG. 3 by step 303.

Also the microphone array audio signals may be analysed to generate the metadata (for example the directions and/or energy ratios) as shown in FIG. 3 by step 305.

The transport audio signals and metadata may then be optionally combined to form a data stream as shown in FIG. 3 by step 307.

The transport audio signals and metadata (or the combined data stream) may (optionally) then be transmitted and received (or stored and retrieved) as shown in FIG. 3 by step 309.

Having received or retrieved the transport audio signals and metadata (or data stream), the output audio signals may be synthesized based at least on the transport audio signals and metadata as shown in FIG. 3 by step 311.

The synthesized audio signal output signals may then be output to a suitable output.

Figure 4:
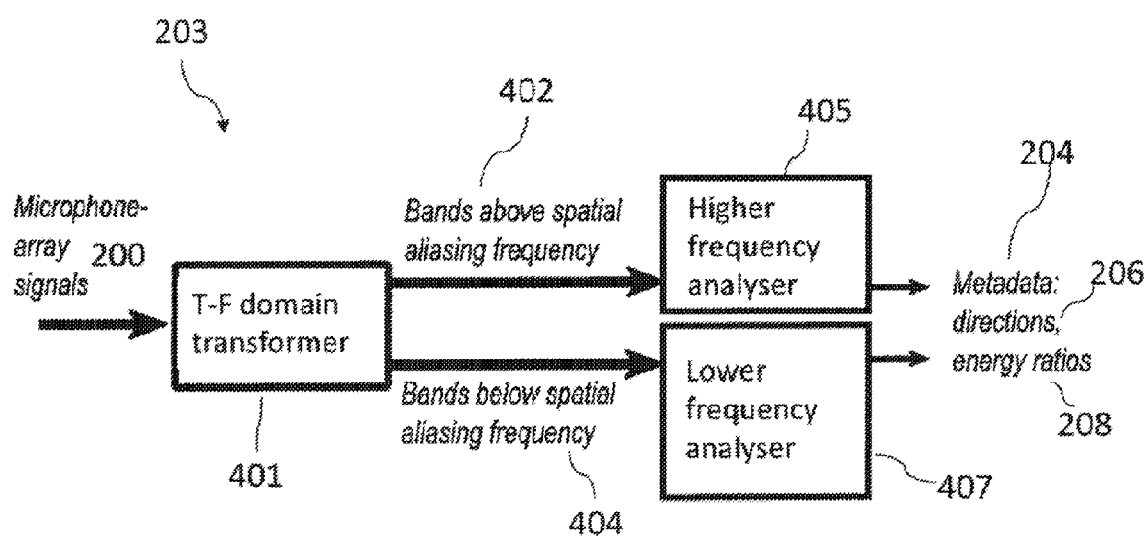
FIG. 4 shows schematically an example analysis processor shown in FIG. 2 according to some embodiments.

With respect to FIG. 4 an example analysis processor 203, such as shown in FIG. 2, is presented. The input to the analysis processor 203 are the microphone array signals 200.

The analysis processor 203 may comprise a time-frequency domain transformer (T-F domain transformer) 401. The forward filter bank 401 is configured to transform the wide-band (time domain) signals into time-frequency signals. The output of the filter bank can then be grouped into frequency bands and the signal components for the lower and higher bands can be selected after the filter bank. A lower frequency analyser 407 may be configured to receive the audio signal frequency bands below the spatial aliasing frequency (or a determined frequency) 404 and determine metadata based on the audio signals. The lower frequency analyser 407 may be configured to determine any suitable spatial metadata parameter. Spatial aliasing frequency is the frequency above which an audio wavelength becomes too small with respect to the array microphone spacing for many traditional methods. Above the spatial aliasing frequency, many traditional methods like linear beamforming fail to produce accurate results.

Any suitable method may be used to determine a direction parameter at the frequencies below the spatial aliasing frequency. For example, a method known as Directional Audio Coding (DirAC) may be implemented which operates on the first order Ambisonics (FOA) signal, or any of its variants.

The FOA signal can be generated by designing and applying appropriate matrix of filters (or matrix of complex gains in frequency bands) for the microphone array signals. Such gains in frequency bands can be generated for example by measuring or simulating the impulse response of the device from (approximately) equally distributed points, and using least-squares optimization methods to derive a set of mixing gains to obtain a matrix that enables obtaining frequency band FOA signal from the frequency band microphone array signals, for each frequency band below the spatial aliasing frequency.

The FOA signals have an omnidirectional component $w(k,n)$ and the three orthogonal dipole components $x(k,n)$, $y(k,n)$ and $z(k,n)$, where k is the frequency index and n is the time index. As in DirAC, the direction can be formulated from the sound field intensity shown as I in the expression below:

$$I(k, n) = -\mathrm{Re}\left(w(k, n)\begin{bmatrix} x^*(k, n) \\ y^*(k, n) \\ z^*(k, n) \end{bmatrix}\right),$$

where Re denotes the real-part and * denotes the complex conjugate. The direction-of-arrival is then the opposite direction of the intensity vector. Note that the intensity vector may be averaged over several frequency and/or time indices (k,n).

In some embodiments the implementation of the DirAC method is configured to also estimate the diffuseness which is a ratio factor between 0 and 1 that determines how much of the total sound energy is non-directional. In other words the ratio of the energy of the non-directional parts of the received audio signals with respect to the overall energy of the received audio signals.

In some other embodiments the lower frequency analyser 407 may be configured to apply methods other than DirAC to the Ambisonics signals. For example a Harmonic planewave expansion (Harpex) and its variants may be employed to estimate two simultaneous directions-of-arrival from the FOA signal. Another example method which may be employed by the lower frequency analyser is a Higher-order DirAC (HO-DirAC). The HO-DirAC is configured to estimate more than one direction of arrival in sectors from the second or higher order Ambisonic signals. Such Ambisonic signals require more microphones from the device, for example at least 9 microphones for second order Ambisonics in 3D.

A further method may be the application of a delay-search algorithm to determine a delay that produces the maximum coherence between microphone array audio signals.

For example, for a capture device in the form of a mobile phone in a landscape mode a delay parameter may be determined between a 'left' and 'right' microphone audio signal. The delay may be normalized so that the maximum delay (the sound arriving from the axis of the microphones) is −1 and 1. The angle parameter may then be determined as acos(d), where d is the estimated and normalized delay parameter. The delay and angle parameter from a pair of microphone audio signals is ambiguous, in other words the same delay can be observed for example if the sound comes 30 degrees (at the front side) and 150 degrees (at the rear side). This ambiguity may be overcome by determining a binary front-back audio signal direction to determine if the sound comes from the front or the back by performing a delay-analysis at a further front-back microphone pair. This method may produce accurate results for capture devices such as mobile phones but may not produce accurate results for general capture device shapes such as shown in FIG. 1b. The reason for this is that the method applies a binary front-back determination to account for the thin axis of the device and estimates the remaining (majority) of the spatial information using the microphones at the two wider axes of the mobile-phone like device. While the approach is suitable for mobile phones and other similarly thin devices, for device in FIG. 1b there is more information available to utilize in all axes of the device. Therefore having only a binary front-back choice at one axis with such a device inevitably may lead to not effectively utilizing the information available at the microphone signals for the directional estimation. This may lead to suboptimal performance in directional estimation especially in more demanding acoustic conditions such as in presence of background noise. Additionally, having only a front-back determination for one axis (and determination of the majority of directional information from other axes) restricts the microphone placement to certain axes mutually dependent from each other, which may make it more difficult to optimize the microphone placement to account for other factors, such as to optimize the linear FOA capture at low frequencies. This method and the methods described herein are applicable for both lower and higher frequencies. The methods described herein utilize better the information conveyed by the inter-microphone properties for devices such as in FIG. 1b, and provide a flexible positioning of the microphones to enable optimization of other factors, such as linear FOA capture at low frequencies.

The higher frequency analyser 405 is configured to receive the audio signals within bands higher than the spatial aliasing frequency. In some embodiments the higher frequency analyser is further configured to receive additional information from the lower frequencies/lower frequency analyser. For example there may be spatial weighting of the higher frequency directional analysis based on lower frequency directional analysis results.

In the higher frequency analyser 405 the audio signals are analysed to determine the spatial metadata parameters. This analysis may be used to produce accurate direction analysis because of the more regular microphone spacing found in some capture apparatus such as shown in FIG. 1b. The term "more regular" indicates that the dimensions of the capture device are more regular than other capture device types such as a mobile phone which would have a long axis (the mobile phone length which may be 10-20 cm), a short axis (the mobile phone width which may be 5-8 cm) and very short axis (the mobile phone thickness which is typically less than 1 cm). Furthermore this analysis is less susceptible to hardware integration and/or design compromised microphone placement. Any capture devices which implement optional mobile-phone type algorithms may require the locating or positioning of microphones on top of each other and adjacent to each other, which may lead to a non-uniform microphone positioning distribution (more microphones located on one side compared to the other side of the device), if the number of microphones is desired to be minimized. For example the capture device such as shown in FIG. 1b implementing mobile-phone type algorithms may require the microphone 111 to be moved to the lower right corner to have it exactly below the microphone 113 and on the same plane as the microphones 115 and 117. This positioning example would result in having more microphones on one side of the device.

The embodiments as discussed herein allow microphones to be positioned flexibly (e.g. no requirement for positioning the microphones on top of each other). Thus for example with respect to the capture device shown in FIG. 1b, the microphones can be placed relatively evenly around device. Furthermore in such embodiments a more regular or even microphone placement may also improve low-frequency analysis performance. For example, generating Ambisonic output signals using linear methods at low frequencies produces more accurate Ambisonic output signals when the microphones are placed around the device more evenly than when they are placed more on the same side.

The higher frequency analyser 405 as implemented in some embodiments employs direction analysis methods which utilize a modified delay analysis approach suitable for non-flat (i.e. non-mobile-phone-like) device shapes, such as the ones shown in FIGS. 1b and 1c. Thus these embodiments produce more accurate direction analysis for a less constrained microphone placement where the sound is able to be captured more evenly from all directions.

In these embodiments the higher frequency analyser 604 (405 in FIG. 4) is configured to analyse the higher frequency audio signals. In some embodiments the same methods may also be applied in the lower frequency analyser.

In other words in some embodiments both frequency bands above the spatial aliasing frequency 402 and frequency bands below the spatial aliasing frequency 404 are analysed by the higher frequency analyser 405.

In such embodiments the direction-analysis is provided that can be used at all frequencies (including above the spatial aliasing frequency) and with devices with no shadowing, partial shadowing, and/or prominent shadowing (at any or all axes).

The direction analysis in the higher frequency analyser 405 may be summarised as:

selecting two or more microphone pairs of the microphone array;

estimating delay information between the selected microphone pairs; and determining the direction-of-arrival vector by applying a matrix operation to the delay estimates, where the matrix operation is based on the locations of the selected microphone pairs.

The direction analysis therefore may be employed from audio signals captured from microphones of the microphone array having displacement in x, y, and z directions. However these placements do not require the microphones to be placed along the x, y, or z axes (e.g., having one microphone on top of the other one).

Another possible analyser method may be for a vector to be determined to express each microphone of the array, where a length of the vector is the estimated energy (or magnitude) of that microphone signal in the frequency bands. The direction-of-arrival may then be determined as the direction of the sum of these vectors. This method, however, requires prominent acoustic shadowing at all axes, which the embodiments described herein do not.

Figure 5:
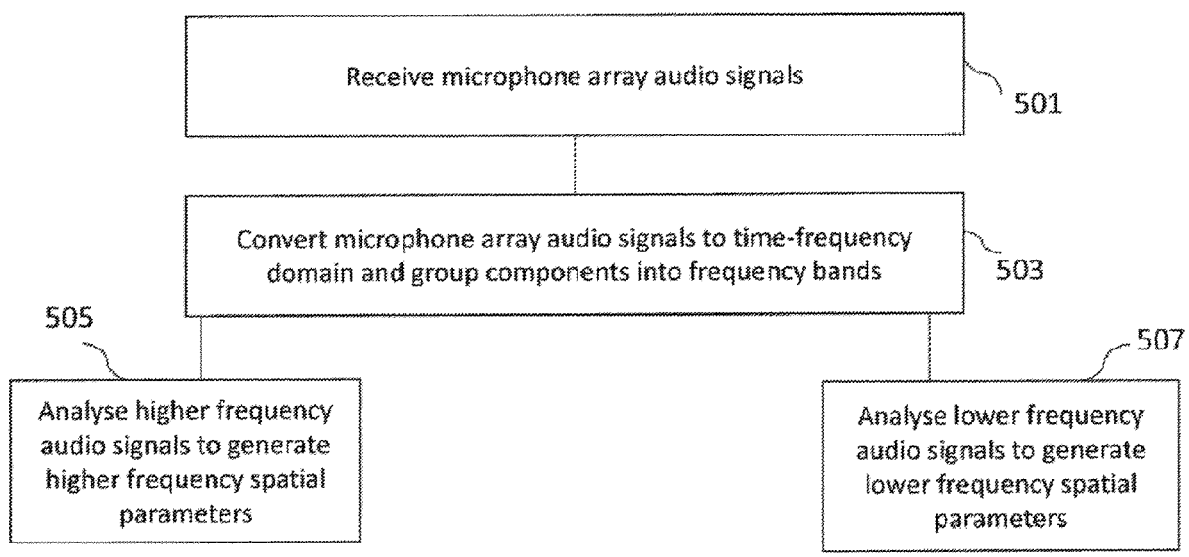
FIG. 5 shows a flow diagram of the operation of the example analysis processor shown in FIG. 4.

With respect to FIG. 5 the operation of the analysis processor 203 is shown.

The initial operation is receiving the microphone array audio signals as shown in FIG. 5 by step 501.

Having received the microphone audio signals they are converted into a time-frequency domain components and frequency bands generated (which include bands above and below the spatial aliasing frequencies) as shown in FIG. 5 by step 503.

Furthermore the higher frequency microphone audio signals are spatially analysed to generate the metadata associated with the audio signals above the spatial aliasing frequencies, for example the directions and energy ratios as shown in FIG. 5 by step 505.

Furthermore the lower frequency microphone audio signals are spatially analysed to generate the metadata associated with the audio signals below the spatial aliasing frequencies, for example the directions and energy ratios as shown in FIG. 5 by step 507.

Figure 6:
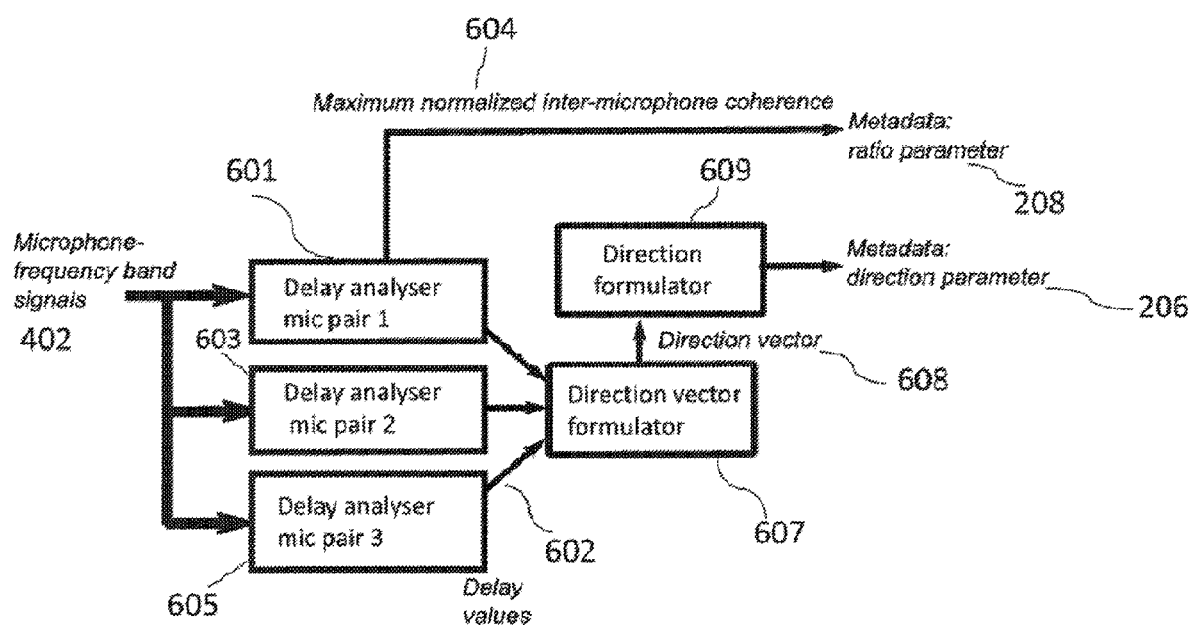
FIG. 6 shows schematically an example higher frequency analyser shown in FIG. 4 according to some embodiments.

With respect to FIG. 6 an example higher frequency analyser is shown. The inputs to the higher frequency analyser 405 are the audio signals of frequency bands above the spatial aliasing frequency from the forward filter bank.

The higher frequency analyser 405 in some embodiments comprises delay analysers shown in FIG. 6 as delay analyser (microphone pair 1) 601, delay analyser (microphone pair 2) 603, and delay analyser (microphone pair 3) 605. Each delay analyser receives a selected pair of microphone audio signals and determines a delay parameter in frequency bands. In some embodiments there is at least two microphone pairs for horizontal surround capture, and at least three microphone pairs for 3D capture.

The selected microphone pairs are determined to span the desired dimensions and may be determined to be as orthogonal as possible (for example: for 3D capture the microphone pairs may not be only in the same plane).

In some embodiments more than one delay analyser is configured to receive the same microphone audio signals. In other words a microphone may be part of more than one microphone pair.

Figure 8:
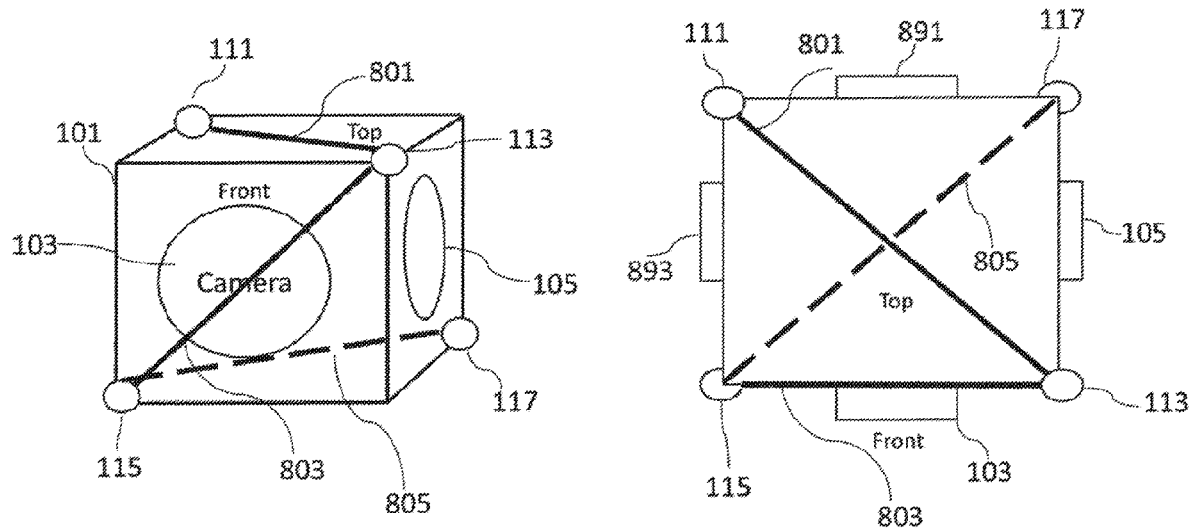
FIG. 8 shows with respect to the example device camera and microphone geometry shown in FIG. 1b example microphone pairs according to some embodiments.

With respect to FIG. 8 is shown the example delay analyser selected pairs of microphones from the capture device shown in FIG. 1b. The first pair of microphones may for example be microphones 111 and 113 defining a first displacement 801 diagonally over the 'top' surface of the device 101. The second pair of microphones may for example be microphones 113 and 115 defining a second displacement 803 diagonally over a 'front' surface of the device. The third pair of microphones may for example be microphones 115 and 117 defining a third displacement 805 diagonally over a 'bottom' surface of the device. FIG. 8 furthermore shows the rear cameras 891 and 893 not shown in FIG. 1b.

For a microphone pair the delay analyser 601, 603, 605 is configured to estimate the delay in frequency bands between the two microphones audio signals. For example, the delay in frequency bands between two microphones can be estimated by finding a delay parameter that maximizes the cross-correlation of the microphone audio signals.

For complex-valued time-frequency signals A(k,n) and B(k,n), where k is the frequency bin index (for example the short time Fourier transform (STFT) bin index), and n is the time index of the time-frequency signal. The spatial analysis (determination of the spatial metadata) may take place in frequency bands which may involve one or more frequency bins of the time-frequency transform. The frequency bands are often designed to approximate a frequency resolution that is relevant for human spatial hearing, such as the Bark bands. One frequency band b, for example, may involve the frequency bins ranging from $k_{b,bottom}$ to $k_{b,top}$. The delay d(b, n) for band b is found by finding a delay that maximizes $$d(b, n) = \underset{\xi}{\operatorname{argmax}} \sum_{k=k_{b,bottom}}^{k_{b,top}} \operatorname{Re}\{A(k, n)B^*(k, n)e^{i2\pi k\xi/K}\}$$

where Re is the real-part operator, * is the complex conjugate and K is the FFT size used in the STFT. In some embodiments similar but different delay analyses formulas can be applied if the filter-bank is something else than STFT.

The delay d(b, n) providing the maximum correlation can be found by determining the correlation with a set of delays $\xi$ ranging between $-D_{max}$ to $D_{max}$, where this maximum delay value $D_{max}$ is determined according to the microphone distance. For example, $D_{max}$ could be exactly the delay value corresponding to the time (in samples) that the sound travels the distance between the microphone pair. $D_{max}$ could also be a somewhat longer than the delay value corresponding to the time (in samples) that the sound travels the distance between the microphone pair, thus accounting for some measurement noise at the delay search edges. The set of delays may be determined with the accuracy of a sample, but also fractional-sample delays may be used (or any other accuracy).

In some embodiments the maximum correlation parameter can be normalized to provide the ratio parameter such as defined below:

$$\text{ratio}(b, n) = \frac{\sum_{k=k_{b,bottom}}^{k_{b,top}} \text{Re}\{A(k, n)B^*(k, n)e^{i2\pi k d(b,n)/K}\}}{\sum_{k=k_{b,bottom}}^{k_{b,top}} |A(k, n)||B(k, n)|}.$$

The direction vector formulator 607 may be configured to receive the output of the delay analysers 601, 603, 605 and determine a direction vector 608 based on the estimated delay values 602 of the microphone pairs.

The direction vector formulator 607 may in some embodiments be configured to formulate a direction vector by the following matrix operation $$s = M \begin{bmatrix} d_1 \\ d_2 \\ d_3 \end{bmatrix},$$

where M is a pre-formulated matrix and the subscripts of d denote the microphone pair. The number of delay values d, i.e., the number of microphone pairs can be two or more, and the matrix M size is accordingly determined. For example, for 3D direction determination and five delay values d the matrix M size is 3×5.

The estimated direction parameter is then the direction of vector s.

In some embodiments the matrix M can be formulated by the following method.

First, vectors are formulated for each microphone pair. For example, if microphone 1 is at position ($x_1$, $y_1$, $z_1$) and a microphone 2 is at position ($x_2$, $y_2$, $z_2$), then a vector between them is $$v = \begin{bmatrix} x_1 - x_2 \\ y_1 - y_2 \\ z_1 - z_2 \end{bmatrix}.$$

Furthermore the direction vector formulator may be configured to determine a matrix V $$V = \begin{bmatrix} v_1^T \\ v_2^T \\ \vdots \\ v_{num\_pairs}^T \end{bmatrix}.$$

The direction vector formulator may be configured to determine a vector (any vector of any length) indicating the direction of an assumed source, and denote this 3×1 vector as s. Then the direction vector formulator may define a vector:

$$d = Vs = \begin{bmatrix} v_1^T \\ v_2^T \\ \vdots \\ v_{num\_pairs}^T \end{bmatrix} s.$$

The vector d contains relative delay values for the microphone pairs as the result of an assumed sound arriving from the direction of vector s. The overall scaling of vector d may be any suitable scale. Furthermore the scaling of vector s or vectors v may be any suitable scaling provided the vectors v have the same mutual scaling.

In some embodiments, for example a real-time example, at a certain time-frequency interval it may be possible to obtain for the set of delay values (in any units or scaling), stored in vector d. The direction vector formulator 607 may estimate a direction vectors corresponding to the estimated delays d. In other words, the direction vector formulator 607 determines matrix M, for which it is able to obtain s from d:

$$s = Md = MVs$$

where the result of the formula is $M = V^{-1}$, which denotes the pseudo-inverse of a matrix containing vectors corresponding to the microphone pairs (from one microphone to the next). In some example embodiments it would be understood that any suitable application of matrix arithmetic can be employed.

As the matrix M is the pseudo-inverse of V, then the vectors within V should represent all axes sufficiently. For example, the vectors in V should span a reasonable volume for 3D capture, or a reasonable area in 2D capture. Considering the 3D case, more "flat" the vector base is, the more unstable the matrix inverse of V is in terms of the effect of the measurement noise to the directional estimates. A practical example of having such flat vector base would be a mobile phone, where one dimension is very small. On the contrary, for 3D devices (or disc-type devices in horizontal capture), the present method is robust in terms of spatial analysis accuracy and stability at all axes.

In some embodiments there may be determined different matrices M that can be applied to estimate the direction vector from the delay values which take account of the situations when it is determined that one or more delay estimates are unreliable. For example a determination of reliability may be made with respect to a coherence value, where the delay estimate is unreliable where the coherence value is smaller than a threshold value. A further determination of reliability may be made with respect to the energy for the corresponding microphone pair in relation to the energies of the other microphone pairs. In some embodiments these unreliable delay values can be omitted or discarded, and another M matrix is applied to the remaining delay values. The replacement matrix M may be the pseudo-inverse of a modified matrix V which is otherwise the same matrix V as above, without the rows corresponding to the omitted microphone pairs.

The direction formulator 609 may then be configured to receive the direction vector 608 and output the direction parameter 206 component of the metadata. The direction-of-arrival is the direction of this resulting vector s in $$s = M \begin{bmatrix} d_1 \\ d_2 \\ d_3 \end{bmatrix}.$$

In some embodiments an estimate of the direct-to-total ratio parameter 208 at the higher frequencies may be generated by selecting the microphone pair that has the largest displacement, and to set as the ratio parameter as a normalized (between 0 . . . 1) delay-compensated correlation 604 between the microphone signals such as found from the delay analysers 601, 603, 605.

Figure 7:
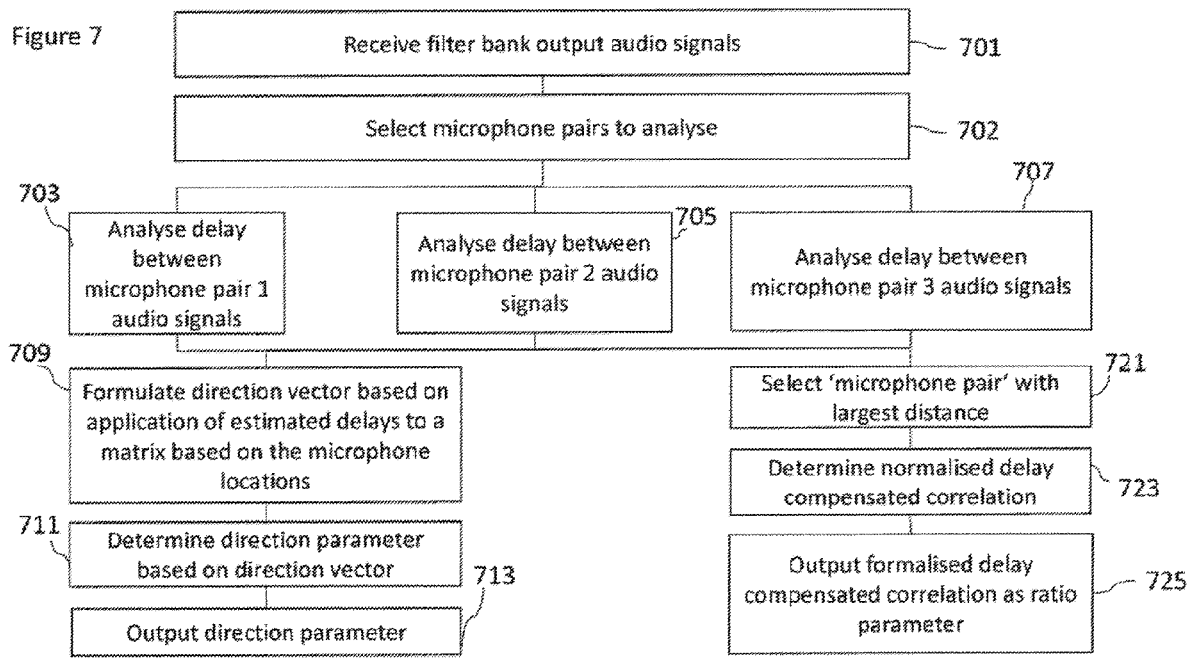
FIG. 7 shows a flow diagram of the operation of the example higher frequency analyser shown in FIG. 6.

With respect to FIG. 7 an example operation of the 'higher' frequency analyser is shown.

The receipt of the filter bank output audio signals is shown in FIG. 7 by step 701.

The selection of suitable microphone pairs to analyse the audio signals is shown in FIG. 7 by step 702.

The analysing of the delay between the microphone pair 1 audio signals is shown in FIG. 7 by step 703.

The analysing of the delay between the microphone pair 2 audio signals is shown in FIG. 7 by step 705.

The analysing of the delay between the microphone pair 3 audio signals is shown in FIG. 7 by step 707.

The formulation of the direction vector by the application of a determined microphone matrix to the delays is shown in FIG. 7 by step 709.

The determination of the direction parameter based on the direction vector is shown in FIG. 7 by step 711.

The outputting of the direction parameter is shown in FIG. 7 by step 713.

The selection of the microphone pair with the largest distance is shown in FIG. 7 by step 721.

The normalisation of the delay compensated correlation is shown in FIG. 7 by step 723. The determination of the delay where maximum correlation is received is a product of steps 703, 705, 707 and 721 and whichever has the largest distance. These steps generate and search different delays and produce the delay that has the maximum correlation which may be normalised by step 723.

The output of the normalised delay compensated correlation value as the energy ratio parameter is shown in FIG. 7 by step 725.

Figure 9:
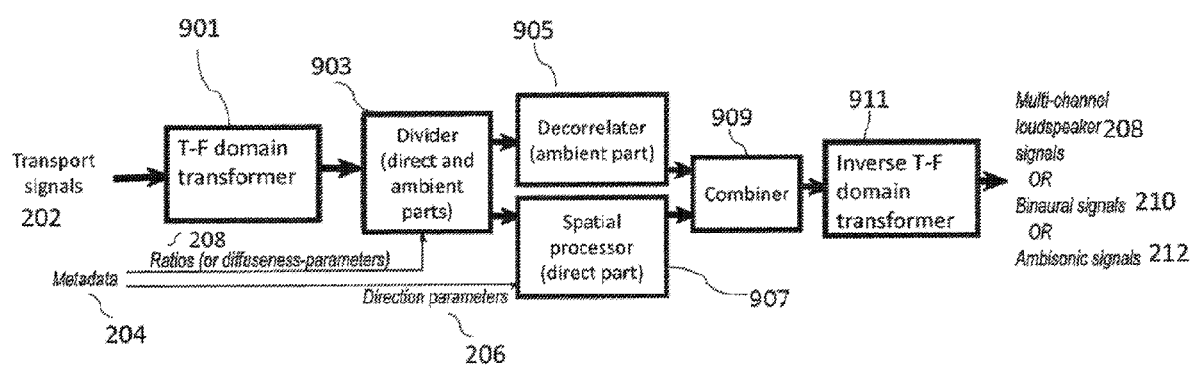
FIG. 9 shows schematically an example synthesis processor shown in FIG. 2 according to some embodiments.

With respect to FIG. 9 an example synthesis processor 207 (as shown in FIG. 2) according to some embodiments is shown.

In some embodiments a demultiplexer may be configured to receive a data stream and demultiplex the data stream into transport audio signals 202 and metadata 204 such as the ratio or other diffuseness parameter 208 and direction parameters 206. In some embodiments, where the transport audio signals were encoded within the analysis processor, the demultiplexer is furthermore caused to decode the audio signals. In some embodiments the metadata is decoded if it was encoded in the analysis processor.

In other embodiments the metadata and transport signals are received or input to the synthesis processor separately.

A T-F domain transformer 901 may receive the transport audio signals 202 and divide the signals into a time-frequency representation. In some embodiments the transport audio signals 202 are transformed to the time-frequency domain using a suitable transformer. For example a short-time Fourier transformer (STFT) may apply a short-time Fourier transform to the transport audio signals to generate suitable time-frequency domain audio signals. In some embodiments any suitable time-frequency transformer may be used, for example a complex-modulated quadrature mirror filterbank (QMF).

A divider 903 may receive the output of the T-F domain transformer 901 and divide the signals into direct and ambient parts based on the ratio metadata parameters 208. Thus the divider 903 may receive the time-frequency domain audio signals and the energy ratios and divide the time-frequency domain audio signals to ambient and direct parts using the energy ratio r(k, n). Note that here ratio r(k, n) is determined for each frequency bin index k instead of ratio(b, n) for each band b. If ratio(b, n) is obtained as an input, it can be mapped to several bins within that band, thus the ratio r(k, n) is obtained. For example in some embodiments the direct part could be obtained by multiplying the input frequency band signals with a factor sqrt(r(k, n)). The ambient part could be obtained by multiplying the input frequency band signals with a factor sqrt(1−r(k, n)).

A decorrelator 905 may be configured to receive the ambient audio signal part and process it to make it perceived as being surrounding, for example by decorrelating and spreading the ambient audio signal part across the audio scene.

A spatial processor 907 may be configured to receive the direct audio signal part and directions 206 and position the direct audio signal part based on the directions. For example in some embodiments the directions 206 are employed to determine panning gains using vector-base amplitude panning (VBAP) and the direct audio signal part is positioned by applying the panning gains to the direct part signal. In some embodiments the gains might be temporally smoothed before they are applied on the direct audio signal.

In embodiments where the output is an Ambisonic signal the VBAP processing may be replaced with spherical-harmonic gain formulation as a function of the direction parameter. The output of the decorrelation in such embodiments may also be processed with determined gains to fit the selected Ambisonic normalization scheme.

In some embodiments the output audio signal is a binaural signal. In that case, the VBAP processing may be replaced with head-related transfer function (HRTF) processing as a function of the direction parameter and the band frequency. In such embodiments the decorrelated signals may be processed to have a frequency-dependent binaural inter-channel coherence instead of full incoherence at all frequencies.

A combiner 909 may be configured to receive the spatially spread ambient signal part from the decorrelator 905 and the positioned direct audio signals part from the spatial processor 907 and combine or merge these resulting audio signals.

An inverse T-F domain transformer which may be a suitable inverse short-time Fourier transformer (Inverse STFT) is configured to receive the combined audio signals and apply an inverse transform to generate the multi-channel audio signals 208 (or binaural signals 210 or ambisonic signals 212) which may be passed to a suitable output device such as the headphones or multi-channel loudspeaker setup.

Figure 10:
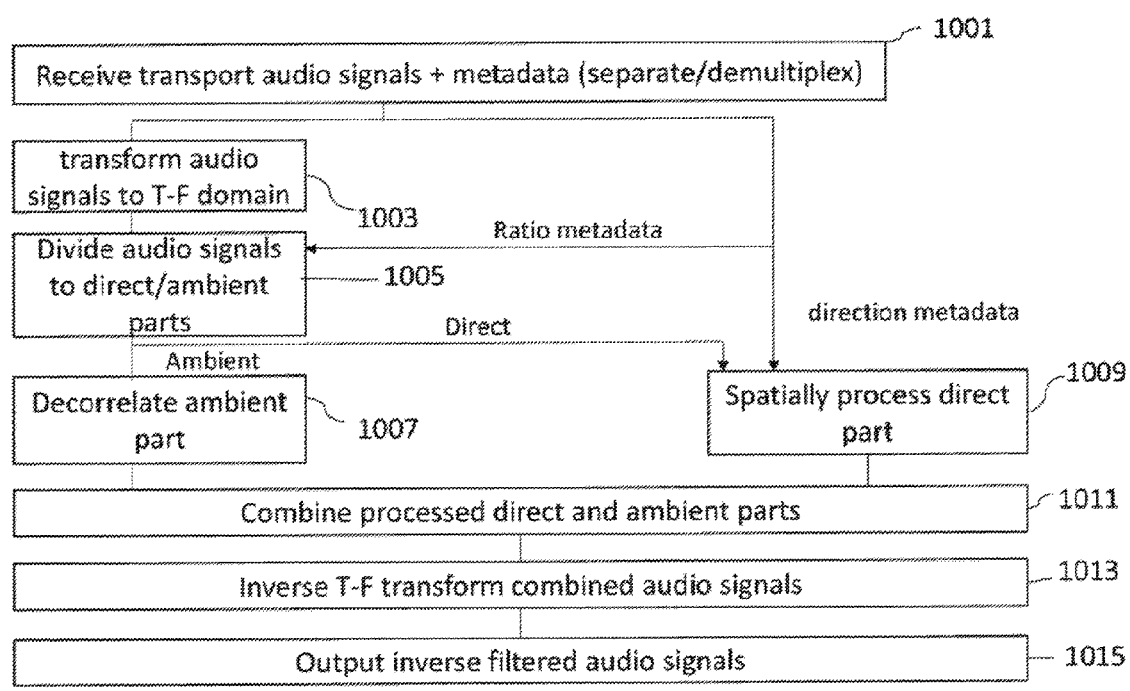
FIG. 10 shows a flow diagram of the operation of the example synthesis processor shown in FIG. 9.

With respect to FIG. 10 the operations of the spatial synthesizer shown in FIG. 9 according to some embodiments are described in further detail.

The spatial synthesizer in some embodiments is configured to receive the transport audio signals and metadata (the energy ratios/directions) as shown in FIG. 10 by step 1001.

The received transport audio signals are in some embodiments converted into a time-frequency domain form (for example by applying a suitable time-frequency domain transform) as shown in FIG. 10 by step 1003.

The time-frequency domain audio signals may then in some embodiments be divided into ambient and direct parts (based on the energy ratios) as shown in FIG. 10 by step 1005.

The ambient audio signal part may be decorrelated as shown in FIG. 10 by step 1007.

The direct part may be spatially processed, for example the determination and application of panning gains to the direct audio signal part as shown in FIG. 10 by step 1009.

The positional component of the audio signals and the decorrelated ambient audio signal may then be combined or merged as shown in FIG. 10 step 1011.

Furthermore the combined audio signals may then be inverse time-frequency domain transformed to generate the multichannel audio signals/binaural audio signals/ambisonic audio signals as shown in FIG. 10 by step 1013.

These multichannel audio signals/binaural audio signals/ambisonic audio signals may be output as shown in FIG. 10 by step 1015.

The synthesis of the audio signal may be any suitable synthesis as the output from both the lower frequency analyser and the higher frequency analyser may be generated in a similar format.

A synthesis processor in some embodiments may be configured to process the spatial sound in terms of the covariance matrices. In such embodiments the input signal has a covariance matrix, and the output signal has another "target" covariance matrix that is determined by the spatial metadata. Such methods are configured to formulate a mixing solution in frequency bands that, when applied to the input signal, generates the target covariance matrix for the output signal, and therefore the intended perceptual spatial characteristics.

Some of the advantages of the proposed embodiments is that capture devices (having microphone arrays) that do not exhibit substantial acoustic shadowing at some axes can be employed with the proposed direction-of-arrival analysis at frequencies above the spatial aliasing frequency. The proposed embodiments can be used to enable robust direction-of-arrival at all frequencies also in the case of no shadowing, partial shadowing or prominent shadowing at all or some axes.

Figure 11:
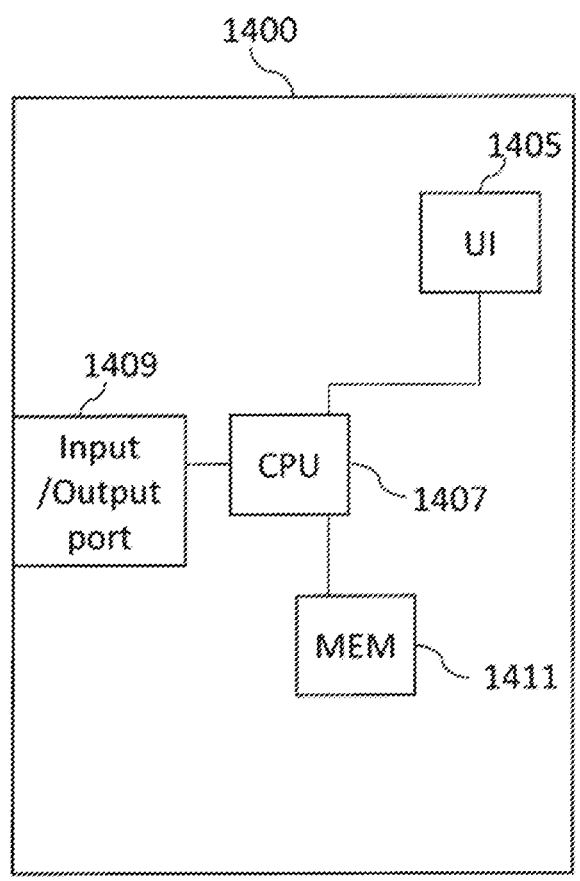
FIG. 11 shows schematically an example device suitable for implementing the embodiments shown.

With respect to FIG. 11 an example electronic device which may be used as the analysis or synthesis processor is shown. The device may be any suitable electronics device or apparatus. For example in some embodiments the device 1400 is a VR camera or other camera device, mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore the device may generate a suitable transport signal and parameter output to be transmitted to the synthesis device.

In some embodiments the device 1400 may be employed as at least part of the synthesis device. As such the input/output port 1409 may be configured to receive the transport signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for spatial audio signal processing, the apparatus comprising:

at least one processor; and at least one non-transitory memory including a computer program code, the at least one memory and the computer program code configured to, with the at least one processor, cause the apparatus at least to:

receive audio signals from a microphone array, the microphone array comprising three or more microphones forming a geometry with defined displacements between at least two microphone pairs of the three or more microphones;

select, from the audio signals, a first part comprising audio signals above a defined frequency, wherein the defined frequency is associated with the geometry, wherein the audio signals further comprise a second part comprising audio signals below the defined frequency;

determine delay information associated with the first part comprising the audio signals above the defined frequency;

determine an operator based on the geometry with the defined displacements between the at least two microphone pairs of the three or more microphones; and apply the operator to the determined delay information to generate at least one direction parameter.

2. The apparatus as claimed in claim 1, wherein the at least one memory and the computer program code are further configured to, with the at least one processor, cause the apparatus to:

identify a pair of microphones of the three or more microphones;

determine a normalised coherence value of audio signals associated with the identified pair of the three or more microphones; and output the normalised coherence value of the audio signals associated with the identified pair of microphones of the three or more microphones as an energy ratio parameter.

3. The apparatus as claimed in claim 2, wherein the apparatus caused to identify the pair of microphones of the three or more microphones comprises the at least one memory and the computer program code are further configured to, with the at least one processor, cause the apparatus to identify a pair of microphones with a largest displacement.

4. The apparatus as claimed in claim 3, wherein the apparatus caused to determine the delay information associated with the first part comprising the audio signals above the defined frequency comprises the at least one memory and the computer program code are further configured to, with the at least one processor, cause the apparatus to select the at least two microphone pairs of the three or more microphones from a complete set of all pairs of the three or more microphones, and wherein the apparatus caused to identify the pair of microphones with the largest displacement comprises the at least one memory and the computer program code are further configured to, with the at least one processor, cause the apparatus to identify a pair of microphones of a group of the three or more microphones with largest displacement from the selected at least two microphone pairs.

5. The apparatus as claimed in claim 1, wherein determining the delay information comprises the at least one memory and the computer program code are further configured to, with the at least one processor, cause the apparatus to:
   determine a first delay associated with a first microphone pair of the at least two microphone pairs based, at least partially, on the first part; and
   determine a second delay associated with a second microphone pair of the at least two microphone pairs based, at least partially, on the first part, wherein the defined frequency associated with the geometry comprises a spatial aliasing frequency associated with the geometry.

6. The apparatus as claimed in claim 1, wherein determining the delay information comprises the at least one memory and the computer program code are further configured to, with the at least one processor, cause the apparatus to:
   select from the audio signals the second part comprising audio signals below the defined frequency associated with the geometry with the defined displacements between the at least two microphone pairs of three or more microphones; and
   analyse the second part comprising the audio signals below the defined frequency to determine further spatial parameters.

7. An apparatus for spatial audio signal processing, the apparatus comprising:
   at least one processor; and
   at least one non-transitory memory including a computer program code, the at least one memory and the computer program code configured to, with the at least one processor, cause the apparatus at least to:
      receive audio signals from a microphone array, the microphone array comprising three or more microphones forming a geometry with defined displacements between pairs of the three or more microphones;
      determine delay information between audio signals associated with the pairs of the three or more microphones;
      determine an operator based on the geometry with the defined displacements between the pairs of the three or more microphones, comprising causing the apparatus to:
         determine displacement vectors associated with a displacement between the pairs of the three or more microphones;
         determine a displacement matrix based on the determined displacement vectors; and
         generate a matrix operator based on the determined displacement matrix; and
      apply the operator to the delay information to generate at least one direction parameter associated with the audio signals.

8. The apparatus as claimed in claim 7, wherein the at least one memory and the computer program code are further configured to, with the at least one processor, cause the apparatus to identify and remove from the determination of the displacement matrix a displacement vector associated with a pair of microphones with unreliable delay information.

9. The apparatus as claimed in claim 8, wherein the at least one memory and the computer program code are further configured to, with the at least one processor, cause the apparatus to determine the pair of microphones with the unreliable delay information based on at least one of:
   a coherence value for audio signals associated with the pair of microphones is less than a defined threshold value; or
   an energy for the audio signals associated with the pair of microphones is less than an energy for audio signals associated with at least one further pair of microphones based on a defined threshold value or ratio.

10. The apparatus as claimed in claim 1, wherein the microphone array comprises one of:
   the three or more microphones, and the at least one direction parameter is a single (azimuth or elevation) dimensional direction parameter; or
   the three or more microphones and at least one further microphone, and the at least one direction parameter is a two dimensional (azimuth and elevation) direction parameter.

11. The apparatus as claimed in claim 1, wherein the apparatus caused to apply the operator to the determined delay information to generate the at least one direction parameter comprises the at least one memory and the computer program code are further configured to, with the at least one processor, cause the apparatus to:
   determine a direction vector with an application of the operator to the determined delay information; and
   generate the at least one direction parameter from a direction of the direction vector.

12. The apparatus as claimed in claim 1, wherein the at least one memory and the computer program code are further configured to, with the at least one processor, cause the apparatus to:
   generate at least one transport signal based on the audio signals; and
   transmit and/or store the at least one transport signal and the at least one direction parameter.

13. The apparatus as claimed in claim 2, wherein the at least one memory and the computer program code are further configured to, with the at least one processor, cause the apparatus to:
   generate at least one transport signal based on the audio signals; and
   transmit and/or store the at least one transport signal, the at least one direction parameter, and the energy ratio parameter.

14. The apparatus as claimed in claim 1, wherein the apparatus caused to determine the delay information associated with the first part comprising the audio signals above the defined frequency comprises the at least one memory and the computer program code are further configured to, with the at least one processor, cause the apparatus to determine the delay information between audio signals associated with the at least two microphone pairs of the three or more microphones.

15. The apparatus as claimed in claim 1, wherein the apparatus caused to determine the delay information associated with the first part comprising the audio signals above the defined frequency comprises the at least one memory and the computer program code are further configured to, with the at least one processor, cause the apparatus to determine the delay information between audio signals on a frequency band by frequency band basis, and wherein the apparatus caused to generate the at least one direction parameter comprises the at least one memory and the computer program code are further configured to, with the at least one processor, cause the apparatus to generate the at least one direction parameter on a further frequency band by frequency band basis.

16. The apparatus as claimed in claim 15, wherein the frequency band by frequency band basis is the same as the further frequency band by frequency band basis.

17. A method for spatial audio signal processing, the method comprising:
- receiving audio signals from a microphone array, the microphone array comprising three or more microphones forming a geometry with defined displacements between at least two microphone pairs of the three or more microphones;
- selecting, from the audio signals, a first part comprising audio signals above a defined frequency, wherein the defined frequency is associated with the geometry, wherein the audio signals further comprise a second part comprising audio signals below the defined frequency;
- determining delay information associated with the first part comprising the audio signals above the defined frequency;
- determining an operator based on the geometry with the defined displacements between the at least two microphone pairs of the three or more microphones; and
- applying the operator to the determined delay information to generate at least one direction parameter.

18. The method as claimed in claim 17, further comprising:
- identifying a pair of microphones of the three or more microphones;
- determining a normalised coherence value of audio signals associated with the identified pair of the three or more microphones; and
- outputting the normalised coherence value of the audio signals associated with the identified pair of microphones of the three or more microphones as an energy ratio parameter.

19. The method as claimed in claim 18, wherein identifying the pair of microphones of the three or more microphones comprising identifying a pair of microphones with a largest displacement.

20. The method as claimed in claim 19, wherein determining the delay information associated with the first part comprising the audio signals above the defined frequency comprising selecting the at least two microphone pairs of the three or more microphones from a complete set of all pairs of the three or more microphones, and wherein identifying the pair of microphones with the largest displacement comprising identifying a pair of microphones of a group of the three or more microphones with largest displacement from the selected at least two microphone pairs.

* * * * *